United States Patent
Fujii et al.

(10) Patent No.: US 6,274,999 B1
(45) Date of Patent: Aug. 14, 2001

(54) INDUCTION MOTOR LOAD COMPENSATION FOR POWER STEERING APPLICATIONS

(75) Inventors: Stanley K. Fujii; Scott D. Downer, both of Torrance; Wade E. Char, Gardena, all of CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/464,101

(22) Filed: Dec. 16, 1999

(51) Int. Cl.[7] .................................................. H02P 7/628
(52) U.S. Cl. .................................... 318/807; 180/443
(58) Field of Search ...................... 318/798, 799, 318/802, 807, 434; 180/443, 445, 446

(56) References Cited

U.S. PATENT DOCUMENTS

| | | | |
|---|---|---|---|
| 4,842,089 | * 6/1989 | Kimbrough et al. | 180/79.1 |
| 5,086,862 | * 2/1992 | Graber et al. | 180/132 |
| 5,441,122 | * 8/1995 | Yoshida | 180/65.2 |
| 5,668,721 | * 9/1997 | Chandy | 701/41 |
| 5,704,446 | * 1/1998 | Chandy et al. | 180/446 |
| 5,709,281 | * 1/1998 | Sherwin et al. | 180/272 |
| 5,719,766 | 2/1998 | Bolourchi et al. | 364/424.052 |
| 5,749,431 | * 5/1998 | Peterson | 180/422 |
| 5,754,026 | * 5/1998 | Hampo et al. | 318/802 |
| 5,809,438 | * 9/1998 | Noro et al. | 701/41 |
| 5,844,387 | * 12/1998 | Mukai et al. | 318/432 |
| 6,002,226 | * 12/1999 | Collier-Hallman et al. | 318/439 |
| 6,046,560 | * 4/2000 | Iu et al. | 318/432 |
| 6,102,151 | * 8/2000 | Shimizu et al. | 180/446 |

* cited by examiner

*Primary Examiner*—Robert E. Nappi
*Assistant Examiner*—Rina I. Duda
(74) *Attorney, Agent, or Firm*—Anthony Luke Simon

(57) ABSTRACT

An induction motor control system for use in a power steering system, comprising: a power steering induction motor coupled to a power supply and providing motive input to pressurize a hydraulic steering subsystem; a phase current sensor for sensing the phase current output by the power supply; and a power steering controller coupled to the power supply for processing a commanded frequency input, the sensed phase current, and data contained in a plurality of software lookup tables using a transfer function to adjust the motor voltage produced by the power supply to control the speed of the power steering motor.

5 Claims, 2 Drawing Sheets

INDUCTION MOTOR LOAD COMPENSATION FOR POWER STEERING APPLICATIONS

The present invention relates to a method and system for induction motor load compensation for power steering applications.

BACKGROUND

The assignee of the present invention designs and develops electric vehicles. In pure electric vehicles, there is not internal combustion engine from which to draw motive power to a hydraulic pump of a hydraulic power steering system. One method to compensate this is to provide a motor, such as an induction motor, as the motive input. The conventional hydraulic system, though, uses mechanical or belt drive from the mechanical input and pressure sensing of the power steering system to provide feedback and control system pressure. This type of system does not provide optimum efficiency and tends to use power to keep the steering system pressurized when not utilizing the pressure to ensure that the system has desired response when a steering input is provided.

It would therefore be desirable to have an improved power steering system for use in electric vehicles. It would also be desirable to have an improved induction motor load compensation algorithm or method for use in electric vehicle power steering systems.

SUMMARY OF THE INVENTION

The present invention provides a method and system for induction motor load compensation for power steering applications particularly suitable for use in an electric vehicle. In an example advantage, the present invention may be used in a system in which the motor for providing power steering system hydraulic pressure operates without the need of a hydraulic pressure sensor or a pressure relief valve as found in certain conventional systems, or motor position sensor feedback.

In an advantage provided by an example implementation, the control method or system provides for induction motor load limiting to avoid excessive power consumption while providing sufficient system pressure and flow over varying loads.

In an advantage provided by an example implementation, the controller and software algorithm or processing method adjusts the output power of the power steering motor by adjusting the output voltage of the power supply to maintain necessary flow and pressure for steering maneuvers. The output power of the power supply changes at different output frequencies. One or more (three, for example) software lookup tables are generated empirically by characterizing the output power of the power supply at different system pressures over a range of motor speeds. The software lookup tables provide a power band that implements a power adjusting state machine. Power calculations are performed at the output voltage signal frequency.

In an advantage provided by an example implementation, the use of the software algorithm or processing method provides relatively fast power steering system response while exerting lower power consumption by matching the output to the load. The relatively fast response maintains sufficient hydraulic system pressure and flow over a range of power steering loads without excessive power consumption. Thus the example system eliminates the need to run in a mode where high hydraulic pressure is maintained but not used.

In an example operation, the software algorithm or processing method dynamically adjusts the output voltage applied to the power steering motor to provide sufficient torque over a range of motor loads. An open loop or open load command (i.e., corresponding to a desired "on center" steering input) is received by the system, typically having been generated as a function of vehicle speed. This command is converted to a voltage command (Vrms) to the switching unit (such as an IGBT power stage) for the induction motor. The output phase current is monitored and used as a correspondence to hydraulic pressure to dynamically adjust the voltage command to maintain the desired pressure.

Advantageously, according to a preferred example, this invention provides an induction motor control system for use in a power steering system, comprising: a power steering induction motor coupled to a power supply and providing motive input to pressurize a hydraulic steering subsystem; a phase current sensor for sensing the phase current output by the power supply; and a power steering controller coupled to the power supply for processing a commanded frequency input, the sensed phase current, and data contained in a plurality of software lookup tables using a transfer function to adjust the motor voltage produced by the power supply to control the speed of the power steering motor.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
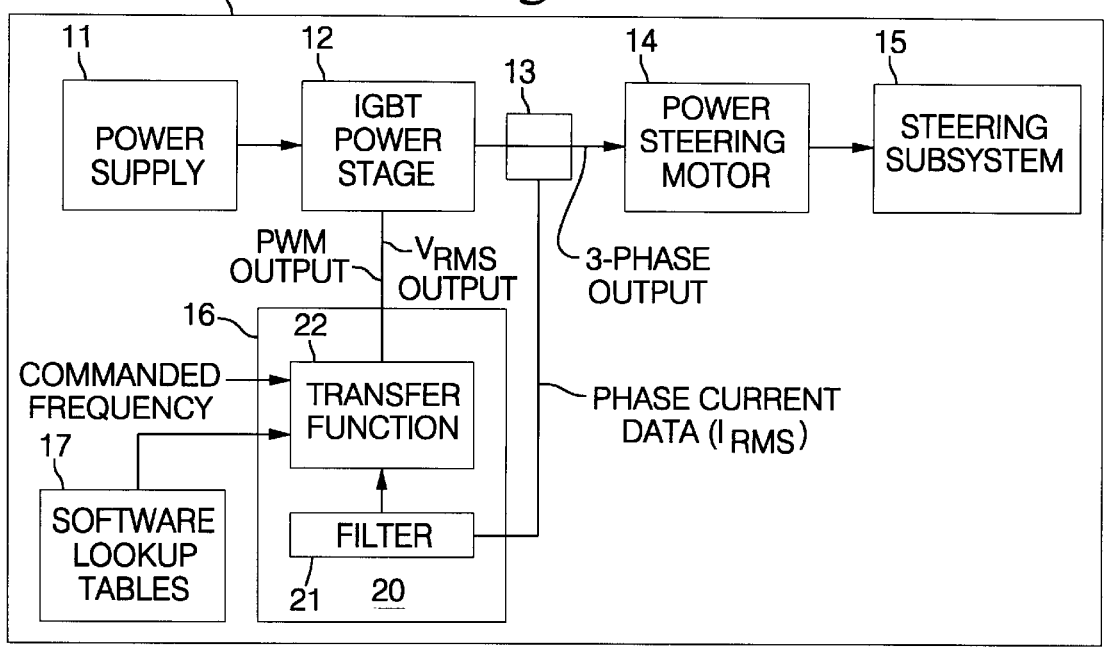
FIG. 1 illustrates an exemplary electric vehicle power steering system in accordance with the principles of the present invention.

Referring to the drawing figures, FIG. 1 illustrates an exemplary power steering system 10 implemented with an example induction motor control system and method of the present invention for use in an electric vehicle. The electric vehicle power steering system 10 comprises a power supply 11 that is coupled by way of an isolated gate bipolar transistor (IGBT) power stage 12 to a power steering motor 14. The power steering motor 14 is coupled to a steering subsystem 15 that is used to steer the electric vehicle.

A phase current (Hall effect) sensor 13 senses the phase current (Irms) output by the power stage 12. A power steering controller 16 is coupled to the power stage 12 that controls the output of the power supply 11 (power stage 12) to control the speed of the power steering motor 14. The power steering controller 16 implements induction motor load adjusting software algorithm 20 or processing method 20.

The power steering controller 16 processes a commanded frequency input (derived from an accelerator pedal, for example, to generate a desired no load pressure according to functions known to those skilled in the art), the sensed phase current which is filtered by a first order lag filter 21, for example, and data contained in a plurality of software lookup tables 17 using a transfer function 22 to adjust the output frequency produced by the power supply 11 via power stage 12. The software lookup tables 17 contain data that correspond to desired operating speeds of the power steering motor 14 as a function of the commanded frequency input for different load conditions.

A characterization of minimum and maximum output voltages is determined empirically based on system load characteristics at "on center" (no load) power steering conditions and at near "full lock" (max load) power steering conditions. A transfer function between the minimum and maximum output voltages is obtained empirically by choosing intermediate system load points on a test stand using the actual steering loads, adjusting the output voltage to obtain the desired flow and pressure performance, and then curve fitting the data (voltage and phase current) using statistical methods. A second order equation was found to provide sufficient accuracy.

The software lookup tables 17 are (empirically) generated by characterizing the output power of the power supply 11 at three different power steering system pressures over a range of speeds of the power steering motor 14. A characterization of minimum and maximum output voltages is determined empirically based on system load characteristics at "on center" (no load) power steering conditions and at near "full lock" (max load) power steering conditions. A transfer function between the minimum and maximum output voltages is obtained empirically by choosing intermediate system load points on a test stand using the actual steering loads, adjusting the output voltage to obtain the desired flow and pressure performance, and then curve fitting the data (voltage and phase current) using statistical methods. A second order equation was found to provide sufficient accuracy.

Three software lookup tables 17 are used to produce a power band that implements a power adjusting state machine in the controller 16. Power calculations are performed at the output voltage signal frequency, since AC output current is calculated at the output frequency.

The software algorithm 20 or processing method 20 adjusts the output supplied by the power supply 11 during varying load conditions in order to maintain a specified pressure in the power steering system 10. The power output of the power supply 11 is controlled by adjusting the output voltage signal frequency produced by the power supply 11. The induction motor load limiting resulting from use of the software algorithm 20 or processing method 20 avoids excessive power consumption and hydraulic system pressure over varying load conditions.

Figure 2:
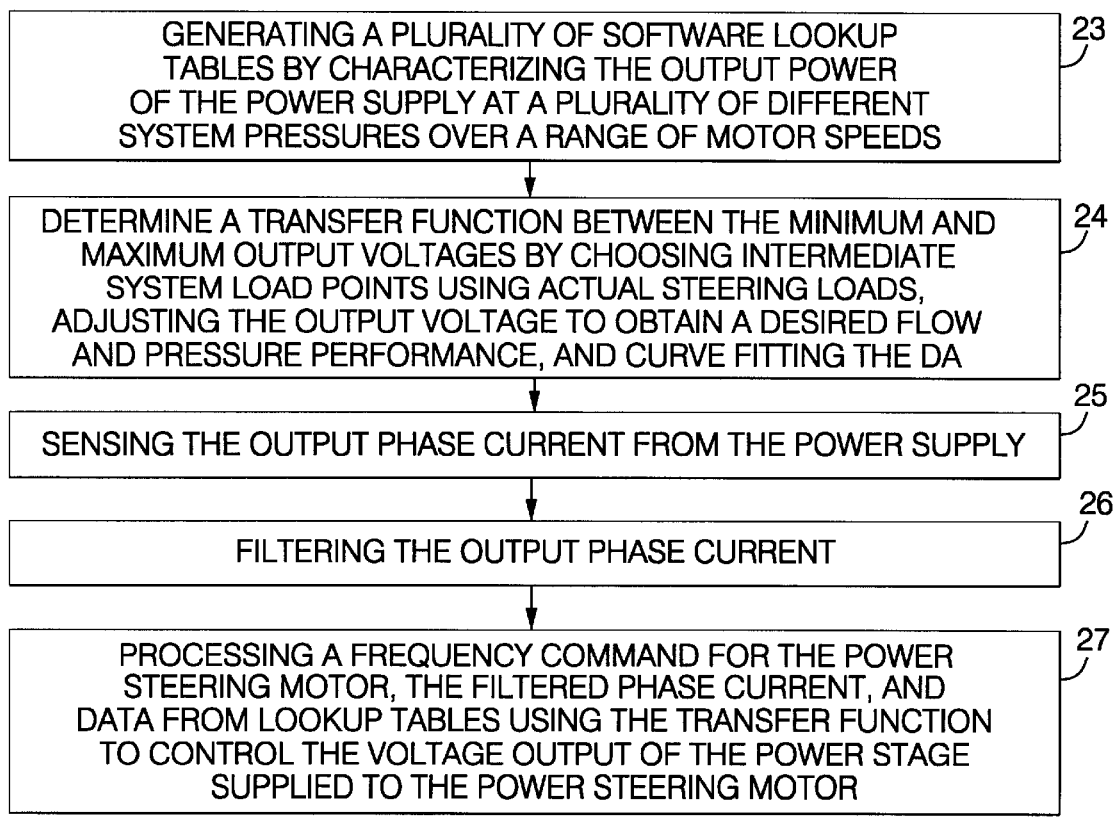
FIG. 2 is flow diagram illustrating an exemplary induction motor load limiting software algorithm or processing method in accordance with the principles of the present invention for use in the electric vehicle power steering system of FIG. 1.

FIG. 2 is flow diagram illustrating an exemplary induction motor load limiting software algorithm 20 or processing method 20 for use in calibrating and operating the power steering system 10 of the electric vehicle. In the software algorithm 20 or processing method 20, the characterization is made to (empirically) determine minimum and maximum output voltages based on system load characteristics at "on center" (no load) power steering conditions and at near "full lock" (maximum load) power steering conditions. One or more software lookup tables are (empirically) generated 23 that characterize the output power of the power supply 11 (and power stage 12) at a plurality of (three) different system pressures over a range of motor speeds.

The transfer function 22 between the minimum and maximum output voltages is (empirically) determined 24 by choosing intermediate system load points on a test stand, for example, using actual steering loads, adjusting the output voltage to obtain the desired flow and pressure performance, and then curve fitting the data (voltage and phase current) using standard statistical methods. A second order equation was found to provide sufficient accuracy.

During operation, the open load command is received to transfer function 22. The output phase current from the power supply 11 (or IGBT power stage 12) is sensed 25. To minimize oscillation, the sensed output phase current is filtered 26 with the first order lag filter 21. The lag filter 21 is defined by the equation:

$$\text{new\_current\_value} = [\text{old\_current\_value} * (N-1) + \text{new\_current\_sample}]/N, (N>1).$$

The output voltage is updated at the output voltage signal frequency in response to the sensed current according to the functions described below.

The commanded frequency, such as is provided by a vehicle controller (as a function of vehicle speed) along with the filtered phase current (Irms) and data from the lookup tables 17 are processed 27 using the transfer function 22 to control the voltage output of the power supply 11 (power stage 12) supplied to the power steering motor 14.

The power steering transfer function 22 employed in the induction motor load compensation software algorithm 20 or processing method 20 and power steering system 10 is as follows. First the command frequency is received as the no load input, for example, from a control module based upon vehicle speed, accelerator position, and/or other inputs as the system designer desires. The transfer function sets the output voltage Vrms to the minimum voltage command corresponding to the frequency command using a look-up table generated during the calibration. This step is represented by: Vrms=Vmin(freq).

Next, if the sensed current is greater than a predetermined threshold (set during calibration to indicate that the steering is no longer in the no load condition) then the voltage command Vrms is adjusted according to the following transfer function:

$$\text{Vrms} = \text{Vmin(freq)} + \text{K0(freq)} * \text{Irms}^{**}2 + \text{K1(freq)} * \text{Irms} + \text{K2(freq)};$$

This transfer function adjusts the motor control voltage in response to system current, which represents system pressure. The voltage command Vrms is then bound by an upper limit, if Vrms is greater than Vmax(freq), then Vrms is set equal to Vmax(freq). Vmax(freq) is determined as a function of command frequency and generated from a look-up table set during the calibration process.

Vmin, Vmax, Imin, K0, K1 and K2 are stored in the calibrated lookup tables 17 derived by characterizing the desired system performance over a range of hydraulic system pressures at any given frequency command during the test and calibration stage.

The controller 16 and software algorithm 20 or processing method 20 employed in the power steering system 10, of the present invention provides for induction motor load limiting to avoid excessive power consumption and hydraulic system pressure when the power steering system 10 is in full-lock or near full-lock position. The present invention does not require the use of a pressure sensor or a pressure relief valve as in conventional systems. Also, the power steering system 10 with its induction motor load compensation software algorithm 20 or processing method 20 exhibits lower power consumption due to load matching.

The present invention dynamically adjusts the output voltage applied to the power steering motor 14 to provide sufficient torque over a range of motor loads. In the present invention, the output phase voltage is dynamically adjusted as a function of the motor phase current and output voltage frequency.

The use of the software algorithm 20 or processing method 20 provides for faster response of the power steering system 10. Improved steering feel is achieved since there is no pressure data latency caused by the use of a pressure sensor. Excessive pressure is not generated and no relief valve is necessary. Furthermore, a position sensor (encoder/resolver) or flow sensor is not required.

Figure 3:
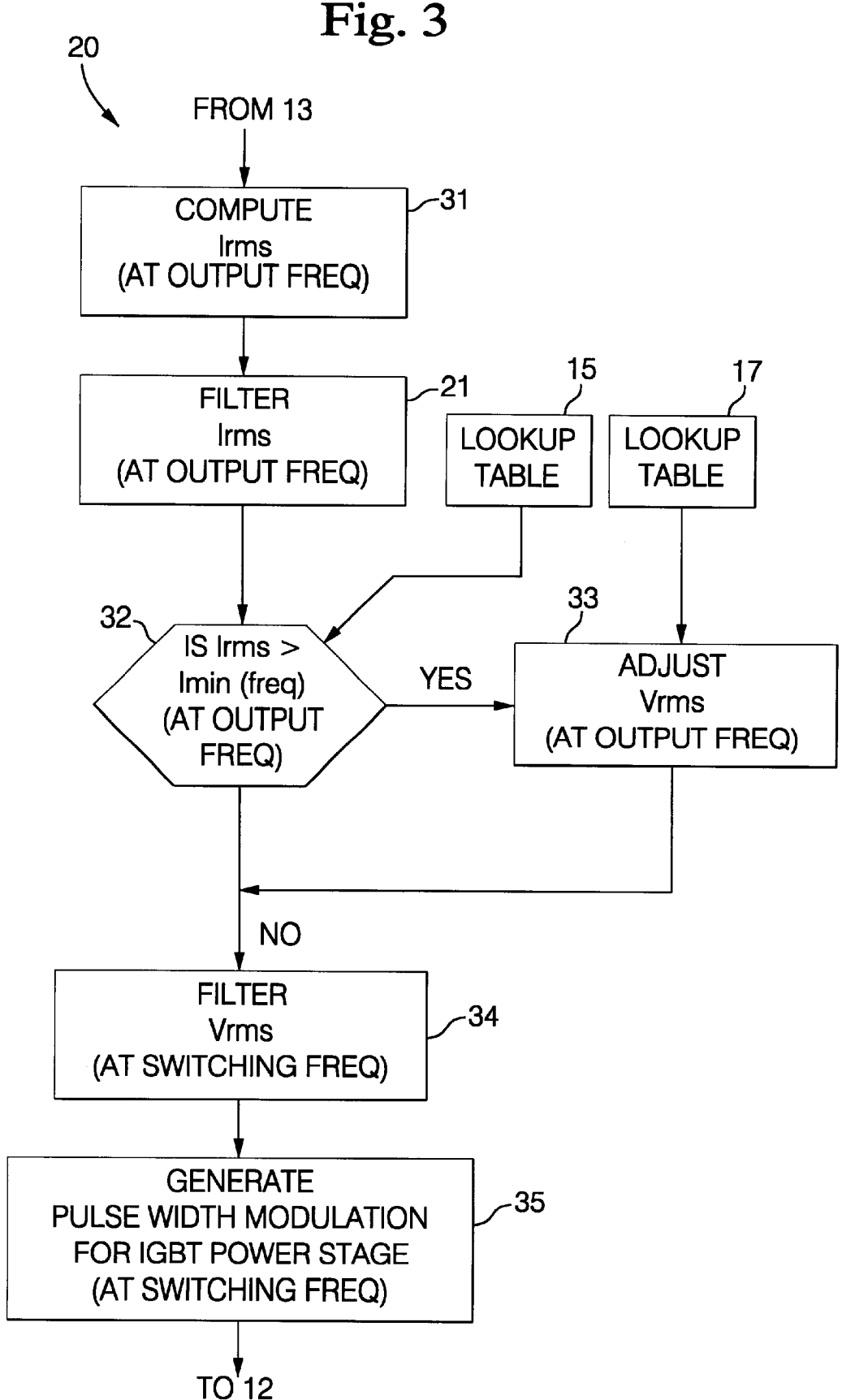
FIG. 3 is a state transition diagram of the induction motor load limiting software algorithm or processing method of FIG. 2.

Referring to FIG. 3, it shows a state transition diagram of the induction motor load limiting software algorithm 20 or processing method 20 of FIG. 2. As is shown in FIG. 3, the output of the phase current sensor 13 is computed 31, such as by means of an analog to digital (A/D) converter, for example, and is filtered 21 to produce the RMS value of the current (Irms). The transfer function 22 in the controller 16 is used in conjunction with the software lookup tables 17 to process 32 the filtered current to determine if it is greater than a minimum current value (Imin). If the filtered current is greater than the minimum current value (YES), then the RMS voltage value is adjusted 33 using one or more software lookup tables 17. An output filter 34 filters the voltage and pulse width modulated signals are generated 35 and applied to the IGBT power stage 12.

Thus, an improved power steering system and induction motor load compensation algorithm or method have been disclosed. It is to be understood that the above-described embodiments are merely illustrative of one of the many specific embodiments that represent applications of the principles of the present invention. Clearly, numerous and other arrangements can be readily devised by those skilled in the art without departing from the scope of the invention.

What is claimed is:

1. An induction motor control system for use in a power steering system, comprising:

a power steering induction motor coupled to a power supply and providing motive input to pressurize a hydraulic steering subsystem;

a phase current sensor for sensing a phase current output by the power supply; and a power steering controller coupled to the power supply for processing a commanded frequency input, the sensed phase current, and data contained in a plurality of software lookup tables using a transfer function to adjust the motor voltage produced by the power supply to control a speed of the power steering motor, wherein the software lookup tables produce a power band that implements a power adjusting state machine.

2. The system recited in claim 1 wherein the controller adjusts the speed of the power steering motor by reducing the power output of the power supply for varying conditions to maintain a specified system pressure.

3. The system recited in claim 1 wherein the software lookup tables are generated empirically by characterizing an output power of the power supply at three different system pressures over a range of motor speeds.

4. A method for controlling an induction motor in a power steering system, the method comprising the steps of:

generating one or more software lookup tables that characterize an output power of a power supply at a plurality of different power steering system pressures over a range of speeds of the induction motor;

determining a transfer function between minimum and maximum output voltages produced by the power supply;

sensing an output phase current from the power supply; and processing a commanded frequency input, the sensed output phase current, and data from the software lookup tables are then processed using the transfer function to control the voltage output of the power supply supplied to the induction motor, wherein the step of determining the transfer function comprises the steps of:

choosing intermediate system load points using actual steering loads;

adjusting the output voltage to obtain a desired flow and pressure performance; and curve fitting the voltage and phase current using statistical methods.

5. A method for controlling an induction motor in a power steering system, the method comprising the steps of:

receiving an open load command;

providing a voltage command corresponding to the open load command to the induction motor;

monitoring current of the induction motor;

if the monitored current rises above a threshold, adjusting the voltage command in response to the current, wherein hydraulic pressure in the power steering system is controlled directly by the motor in response to the sensed current, eliminating the need for a pressure relief valve to control hydraulic pressure.

* * * * *